H. F. CLEEVE.
VEHICLE WHEEL.
APPLICATION FILED JUNE 16, 1920.

1,415,991.

Patented May 16, 1922.

Inventor
Henry F. Cleeve,
By Frederick V. Winters
Attorney.

UNITED STATES PATENT OFFICE.

HENRY F. CLEEVE, OF JAMAICA, NEW YORK, ASSIGNOR OF ONE-THIRD TO WILLIAM J. BILLINGS, OF JAMAICA, NEW YORK.

VEHICLE WHEEL.

1,415,991.	Specification of Letters Patent.	Patented May 16, 1922.

Application filed June 16, 1920. Serial No. 389,323.

*To all whom it may concern:*

Be it known that I, HENRY F. CLEEVE, a subject of the King of Great Britain, residing at Jamaica, in the county of Queens and State of New York, have invented certain new and useful Improvements in Vehicle Wheels, of which the following is a full, clear, and exact specification.

This invention relates to vehicle wheels, and has for its object to provide an improved pneumatic rim or tire structure which will have the resiliency of an ordinary pneumatic tire but which is not subject to puncture.

It is also the object of this invention to provide a device of the kind referred to which is simple in construction and inexpensive to manufacture, but withal easy to assemble and durable in use. Other objects will appear as the description proceeds.

The invention will be first hereinafter described in connection with the accompanying drawings, which constitute part of this specification, and then more specifically defined in the claims at the end of the description.

In the accompanying drawings, wherein similar reference characters are used to designate corresponding parts throughout the several views:—

Figure 1:
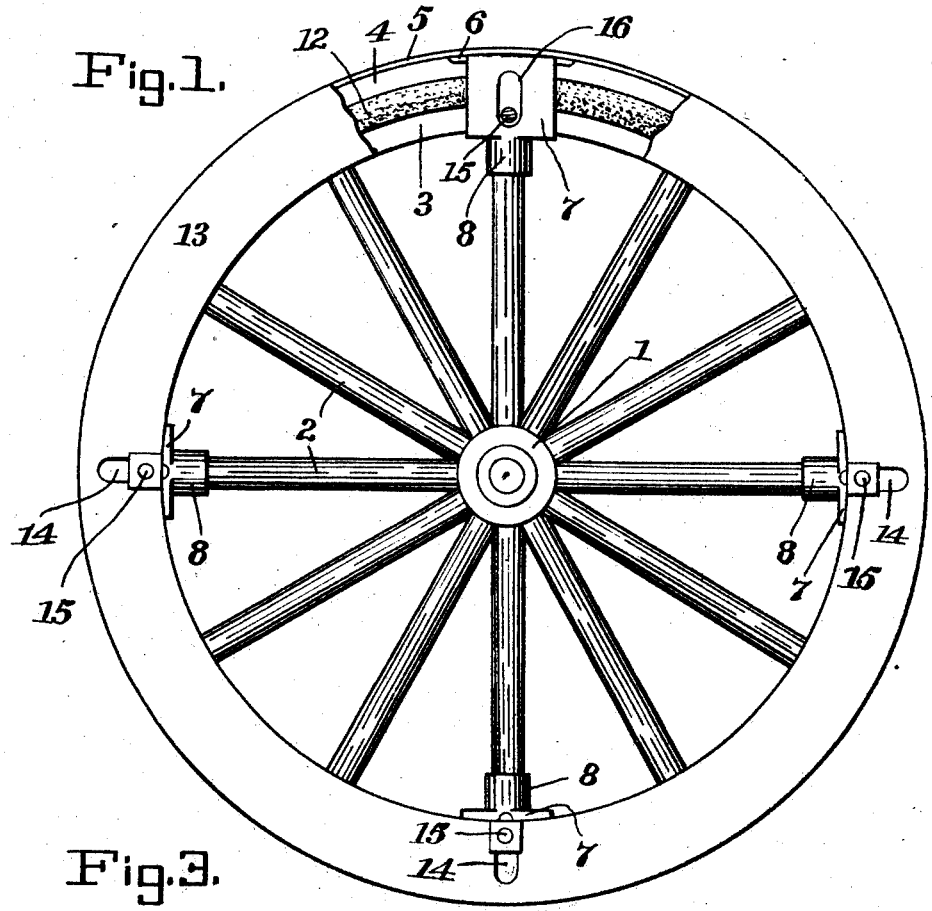
Figure 1 is a side elevation of a vehicle wheel constructed substantially in accordance with this invention, part of one of the ring-shaped side plates being broken away to show one of the rim embracing clamps.
Figure 3:
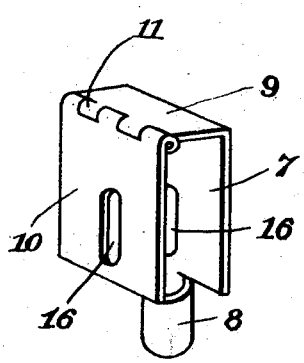
Figure 3 is a detailed perspective view of one of the clamps.

The improved rim or tire may be applied to an ordinary wheel, such as that illustrated in Figure 1 and which has a hub 1, spokes 2 and felly or inner rim 3, the spokes being suitably fastened to said hub and inner rim. An outer rim 4 is arranged concentrically around the inner rim or felly 3 in spaced relation thereto, and between said rims is fitted or interposed a pneumatic tube 12.

At suitable intervals around the rim of the wheel clamps are placed around the inner and outer rims and tube. Each clamp consists of a side portion 7 bent into L-shape with a transverse portion 9 to extend across the outer surface or periphery of the outer rim, and a separate side portion 10 hinged at 11 to the end of said transverse portion 9 of the L-shaped part. The inner end of the part 7 carries a tubular extension or collar 8 which is engaged with one of the spokes 2 and adapted to slide radially thereon. The parts 7 and 10 have radial slots 16 which are engaged with a bolt 15 passed through the inner rim 3 for retaining the clamp in place and insuring its proper radial movement when the wheel is in use without undue binding of the parts. The transverse portion 9 is seated in a groove 6 in the periphery of the outer rim 4, so that it will lie flush with said periphery. The grooves 6 around the wheel are made somewhat longer than the width of the transverse portions of the clamps, as shown in Figure 1, in order to allow for the slight shifting of the outer rim due to its radial movement when the wheel is rotated under a load. A tire or tread member 5 of metal or any other suitable material is mounted on the periphery of the outer rim and covers the recesses or grooves 6 and transverse portions of the clamps.

Figure 2:
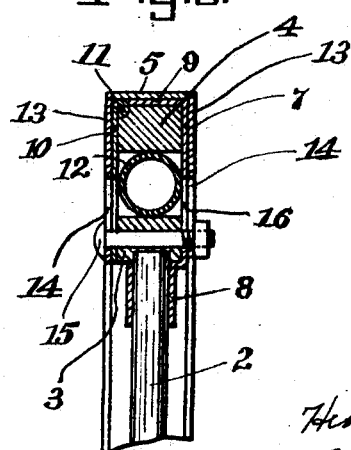
Figure 2 is a section through the rim and one of the clamps.

A pair of similar ring-shaped plates 13 are placed at opposite sides of the rims 3 and 4 and extend outward across the space occupied by the pneumatic tube between said inner and the outer rim for protecting said rims and tube. Said plates 13 also extend out at the sides of the tire or tread member 5 and serve to retain the latter in place on the outer rim. The plates 13, which are not rigidly connected to either the inner rim 3 or the outer rim 4, are retained in place themselves by the bolts 15 extending through slots 14 therein, said slots being of suitable dimensions to allow for the shifting of the plates during the rotation of the wheel under a load. As shown in Figure 2, the tire or tread member 5 is made wide enough to cover the transverse portions of the clamps and engage the ring-shaped plates 13 at opposite sides, while said plates cover the side portions of the clamps as well as the sides of the rims and pneumatic tube.

When it is desired to replace the pneumatic tube or tire, it is only necessary to remove the plate 13 on the side with the hinged portions 10 of the clamps, whereupon said hinged portions may be swung away from the rims permitting access to the tube without disengaging said clamps from the spokes.

It will be noted that the clamps by engaging the spokes of the wheel and the grooves 6 in the rim 4 keep said rim from creeping around the wheel and thus prevent undue wear on the pneumatic tube 12. The metal rim 5 fits tightly around the rim 4 so that the former is not apt to creep when the latter is held in position by the clamps. The provision of the hinged side portions 10 on the clamps allow for readily inserting and removing the pneumatic tube when occasion requires.

Having thus described my invention, what I claim as new and desire to secure by Letters Patent of the United States is:—

1. In a vehicle wheel, the combination with inner and outer concentric rims, of a pneumatic tube interposed between them, and clamps surrounding said rims and tube and having collars embracing and adapted to slide on certain of the spokes of the wheel, for the purpose specified.

2. In a vehicle wheel, the combination with inner and outer concentric rims, of a pneumatic tube interposed between them, clamps surrounding said rims and tube and adapted to slide radially on said inner rim, there being recesses in the outer face of the outer rim in which the outer portions of said clamps are seated, and a tire mounted on said outer rim over the clamps.

3. In a vehicle wheel, the combination with inner and outer concentric rims, of a pneumatic tube interposed between them, clamps surrounding said rims and tube and adapted to slide radially on said inner rim, there being recesses in the periphery of the outer rim of greater length than the width of the clamps and in which the outer portions of said clamps are seated, and a tire mounted on said outer rim over the clamps.

4. In a vehicle wheel, the combination with inner and outer concentric rims, of a pneumatic tube interposed between them, clamps surrounding said rims and tube and adapted to slide radially on said inner rim, and ring-shaped plates also having radial sliding movement on said inner rim and inclosing the tube at opposite sides of said rims.

5. In a vehicle wheel, the combination with inner and outer concentric rims, of a pneumatic tube interposed between them, and clamps surrounding said rims and tube, each clamp having an L-shaped portion extending at one side of the rims and across the periphery of the outer rim, and a plate portion hinged to the end of the periphery engaging portion of said L-shaped part and extending at the other side of the rims, there being means for connecting said side portions of the clamps to the inner rim so that they may slide radially thereon for the purpose specified.

6. In a vehicle wheel, the combination with inner and outer concentric rims, of a pneumatic tube interposed between them, clamps surrounding said rims and tube and having radial slots therein, ring-shaped plates closing the space between the rims at the sides of the tube, said plates also having radial slots registering with those in the clamps, and bolts projecting from one of the rims through said slots for the purpose specified.

7. In a vehicle wheel, the combination with inner and outer concentric rims, of a pneumatic tube interposed between them, and clamps surrounding said rims and tube and adapted to slide radially on said inner rim, there being recesses in the outer face of the outer rim in which the outer portions of said clamps are seated.

8. In a vehicle, the combination with inner and outer concentric rims, of a pneumatic tube interposed between them, clamps surrounding said rims and tube and adapted to slide radially on said inner rim, there being recesses in the outer face of the outer rim in which the outer portions of said clamps are seated, and ring-shaped plates closing the space between the rims at the sides of the tube and radially movable on one of the rims.

9. In a vehicle wheel, the combination with inner and outer concentric rims, of a pneumatic tube interposed between them, clamps surrounding said rims and tube and adapted to slide radially on said inner rim, there being recesses in the outer face of the outer rim in which the outer portions of said clamps are seated, and ring-shaped plates closing the space between the rims at the sides of the tube and radially movable on the inner rim, the outer edges of said plates extending beyond the outer rim at opposite sides of said tire.

10. In a vehicle wheel, the combination with inner and outer concentric rims, of a pneumatic tube interposed between them, clamps surrounding said rims and tube and having collars embracing and adapted to slide on certain of the spokes of the wheel for the purpose specified, and ring-shaped plates closing the space between the rims at the sides of the tube and radially movable on one of the rims.

11. In a vehicle wheel, the combination with inner and outer concentric rims, of a pneumatic tube interposed between them, clamps surrounding said rims and tube and having collars embracing and adapted to slide on certain of the spokes of the wheel for the purpose specified, ring-shaped plates closing the space between the rims at the sides of the tube and radially movable on the inner rim, and a tire mounted on the outer rim over the clamps.

In testimony whereof I have signed my name to this specification.

HENRY F. CLEEVE.